United States Patent [19]

Rosaen

[11] 4,273,651
[45] Jun. 16, 1981

[54] RETURN LINE FILTER

[76] Inventor: Nils O. Rosaen, 5490 Waldon, Clarkston, Mich. 48016

[21] Appl. No.: 67,446

[22] Filed: Aug. 20, 1979

[51] Int. Cl.³ .............................................. B01D 27/10
[52] U.S. Cl. .................................... 210/130; 210/172; 210/DIG. 14
[58] Field of Search .................. 210/90, 130, 136, 172, 210/435, 440, 443, DIG. 14

[56] References Cited

U.S. PATENT DOCUMENTS

| | | | |
|---|---|---|---|
| 3,653,512 | 4/1972 | Brown | 210/130 |
| 3,747,761 | 7/1973 | Heinrich, Jr. | 210/172 X |
| 4,167,483 | 9/1979 | Rosaen et al. | 210/130 |

Primary Examiner—Ivars C. Cintins
Assistant Examiner—Richard W. Burks
Attorney, Agent, or Firm—Gifford, VanOphem, Sheridan & Sprinkle

[57] ABSTRACT

An improved return line filter is provided for use with a fluid system having a fluid reservoir which is at least partly filled with a fluid. The return line filter comprises an elongated housing having an open top and a partially open bottom and in which the housing is positioned within the reservoir so that the lower end of the housing is submerged in the reservoir fluid. A fluid inlet is formed on the lower end of the housing. A filter assembly is provided for use with the housing and comprises a tubular filter element open at each end and a holder assembly which is detachably secured to one axial end of the filter element. The entire filter assembly is insertable through the open top of the housing so that the tubular filter element is positioned coaxially around and spaced radially outwardly from a portion extending upwardly from the housing thus forming an annular chamber therebetween. Fluid seals sealingly connect both axial ends of the filter element with the housing portion while a fluid passageway fluidly connects the housing inlet with the annular inlet chamber. In addition, a deflection and antifoam tube secured to the holder assembly is positioned coaxially around and spaced radially outwardly from the filter element so that fluid flow from the filter element is deflected downwardly toward the partially open bottom of the housing. This construction for the filter assembly creates a reverse fluid flow in which the fluid must first flow upwardly from the bottom of the housing, out through the filter element and subsequently down through the lower open end of the housing.

13 Claims, 3 Drawing Figures

RETURN LINE FILTER

BACKGROUND OF THE INVENTION

I. Field of the Invention

The present invention relates generally to filter assemblies and, more particularly, a return line filter assembly which is at least partially submerged in a fluid reservoir.

II. Description of the Prior Art

There have been a number of previously known return line filters adapted for connection with a fluid system and, particularly, hydraulic systems. Such return line filters typically comprise a housing at least partially submerged within a fluid reservoir while a filter element is positioned within the interior of the housing. A fluid inlet on the housing is fluidly connected to the return line from the fluid system while passage means formed through the housing connect the inlet to one side of the filter element. Fluid flow into the housing inlet thus flows through the fluid passage means and through the filter so that the filtered fluid enters the fluid reservoir.

These previously known return line filters, however, have all suffered from a number of disadvantages. One disadvantage of many of the previously known return line filters is that the filter element could not be removed for cleaning or replacement without shutting down the entire fluid system. This is particularly disadvantageous when frequent changes of the filter element are required.

A still further disadvantage of many of these previously known filter assemblies is that the filter assemblies were often operated during the inadvertent or even intentional omission of a filter element from the filter assembly. The omission of the filter element, of course, enabled debris and other foreign matter to undesirably enter the fluid system. Moreover, detection of omitted filter elements required the opening of the housing for visual inspection of the filter element.

A still further disadvantage of many of these previously known return line filter assemblies is that removal of the filter element from the filter assembly in turn undesirably removed a portion of the fluid from the reservoir due to the suction of the filter element. This removed fluid oftentimes splashed on the floor and created an undesirable and unsafe working environment.

A still further disadvantage of many of these previously known return line filters is that splashing of the fluid during either the filtering operation or, alternatively, when the filter element was removed from the housing, oftentimes introduced air bubbles into the fluid. Such air bubbles can enter the fluid system and adversely affect the operating efficiency of the system. Moreover, in the case of a hydraulic system, such air bubbles can cause pump cavitation and even create air pockets within the hydraulic system.

SUMMARY OF THE PRESENT INVENTION

The present invention provides an improved return line filter which overcomes all of the above mentioned disadvantages of the previously known return line filters.

In brief, the return line filter according to the present invention comprises an elongated housing open at both ends and in which the lower end of the housing is submerged within the fluid of a fluid reservoir. A fluid inlet is formed on the lower end of the housing.

A filter assembly is also provided for use with the housing. The filter assembly comprises a tubular filter element which is open at both axial ends and a holder assembly which is detachably secured to one end of the filter element. The entire filter assembly is insertable through the open top of the housing, so that a portion of the housing extends entirely axially through and is spaced radially inwardly from the tubular filter element thus forming an annular inlet chamber therebetween. Suitable seals fluidly seal both axial ends of the filter element to the housing portion. In addition, fluid passage means formed through the housing fluidly connect the housing inlet with the annular inlet chamber.

A tubular member is connected to the holder assembly so that upon connection of the holder assembly with the filter element, the tubular member extends coaxially around but is spaced radially outwardly from the filter element. Moreover, the tubular member is closed at its top against the top of the filter element so that the tubular member diverts fluid flow radially outwardly from the filter element downwardly through the partially open bottom of the housing. The lower end of the tubular member is positioned below the fluid level in the reservoir and thus also prevents splashing of the fluid and the introduction of air into the fluid after it has been filtered.

An indicator member is secured to the other axial end of the holder assembly while a closure cap is provided for closing the open top of the housing following insertion of the filter assembly into the housing. Moreover, the closure cap includes an aperture into which at least a portion of the indicator member is received and is visible exteriorly of the housing. The indicator member thus provides a signal that the filter assembly is properly positioned within the return line filter housing without the necessity of opening the housing for inspection.

BRIEF DESCRIPTION OF THE DRAWINGS

A better understanding of the present invention will be had upon reference to the following detailed description when read in conjunction with the accompanying drawings, wherein like reference characters refer to like parts throughout the several views, and in which.

DETAILED DESCRIPTION OF THE PRESENT INVENTION

Figure 1:
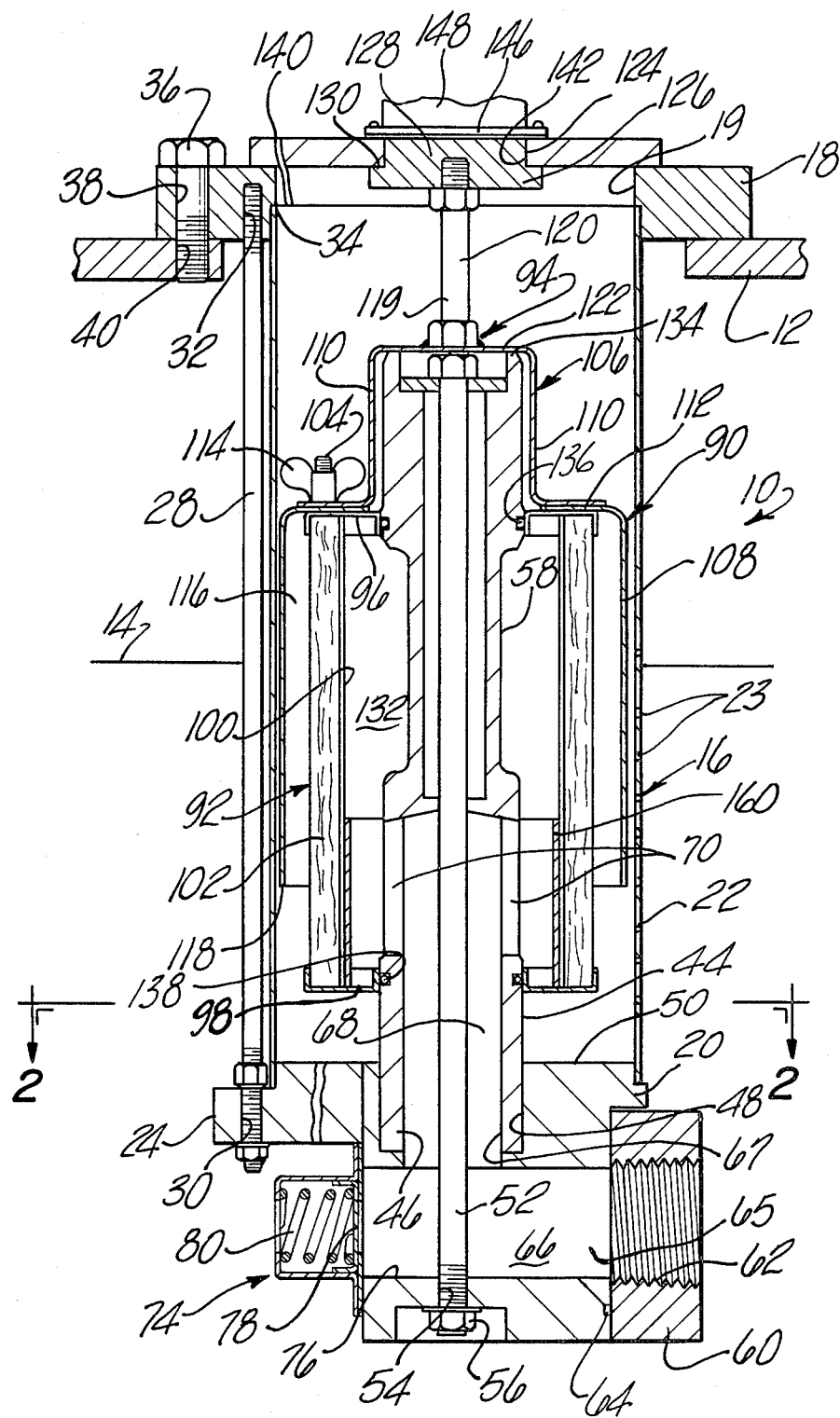
FIG. 1 is a longitudinal sectional view illustrating the return line filter according to the present invention.

With reference first to FIG. 1, the return line filter assembly 10 according to the present invention is thereshown mounted in a fluid reservoir 12 in a manner which will be shortly described. The fluid reservoir 12 is at least partially filled with a fluid to a fluid level 14.

Figures 2, 3:
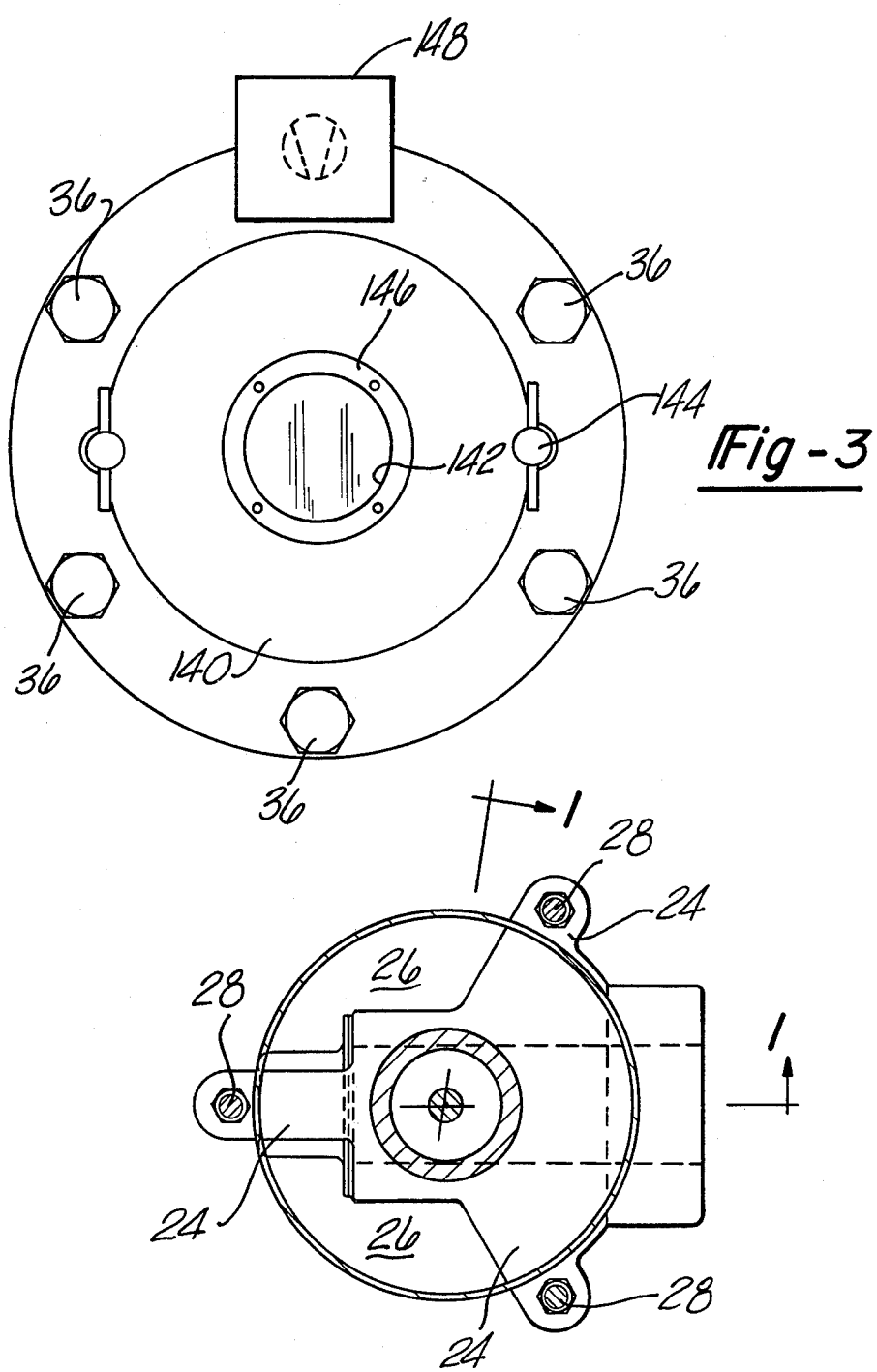
FIG. 2 is a sectional view taken substantially along lines 2—2 in FIG. 1.
FIG. 3 is a top view illustrating the return line filter according to the present invention.

With reference now to FIGS. 1 and 2, the filter assembly 10 comprises an elongated housing 16 having an open upper end 19 and an upper annular mounting flange 18, a lower housing part 20 and a cylindrical guide tube 22 sandwiched therebetween. The lower housing part 20 includes a number of circumferentially spaced and radially outwardly extending legs 24 (best shown in FIG. 2) against which the lower end of the guide tube 16 abuts while the spaces 26 between the legs 24 are open to the fluid reservoir 12.

The mounting flange 18 is secured to the lower housing part 20 by elongated bolts 28 which extend through apertures 30 formed through the legs 24 and adjacent their outer or free end. The upper end of the bolts 28 threadably engage threaded bores 32 formed in the mounting flange 18. The upper end of the guide tube 22 abuts against an annular abutment surface 34 on the mounting flange 18 so that, upon tightening of the bolts 28, the lower housing part 20 is rigidly secured to the mounting flange 18 while the guide tube 22 is rigidly sandwiched therebetween.

With reference to FIGS. 1 and 3, the mounting flange 18 is secured to the reservoir 12 by circumferentially spaced bolts 36 extending through apertures 38 in the mounting flange 18 and registering apertures 40 in the reservoir 12. The housing 16 is oriented so that it extends generally vertically into the reservoir 12 and, in addition, the housing 16 is longitudinally dimensioned so that the lower housing part 20 is submerged below the fluid level 14 of the reservoir 12.

Now referring to FIGS. 1 and 2, the housing 16 further includes an elongated and generally cylindrical housing part 44 having its lower end 46 positioned within a cylindrical recess 48 formed on the top 50 of the lower housing part 20. The housing parts 44 and 20 are secured together by means of an elongated bolt 52 which extends axially through the housing part 44 and aperture 54 formed through the lower housing part 20 cooperate with a conventional nut 56. Upon tightening, the bolt 52 rigidly secures the housing parts 44 and 20 together so that the housing part 44 extends coaxially through the interior of the guide tube 22. In addition, the housing part 44 includes a reduced diameter portion 58 along its length for a reason to be subsequently described.

An annular fluid connector flange 60 having a throughbore 62 is secured to the lower housing part 20 and forms the inlet for the return line filter assembly 10. The flange 60 is adapted for connection with a standard fluid fitting. An O-ring seal 64 between the flange 60 and the lower housing part 20 prevents fluid leakage around the flange 60.

The flange throughbore 62 registers with one end 65 of a transverse fluid passageway 66 formed through the lower housing part 20. The fluid passageway 66 in turn is open to the lower end 67 of an axially extending fluid passageway 68 formed through the elongated housing part 44. The fluid passageway 68 terminates at a pair of diametrically opposed fluid ports 70 formed through the housing part 44 at a position spaced upwardly from the top 50 of the lower housing part 20. In addition, the bolt 52 which connects the housing parts 44 and 20 together extends coaxially through the fluid passageway 68 thus eliminating the necessity of drilling an additional bolt hole entirely through the housing part 44 for the connecting bolt 52.

A relief valve assembly 74 is connected to the lower housing part 20 at the other end 76 of the transverse fluid passageway 66. The relief valve 74 is of a conventional construction and includes a valve member 78 which is urged towards a closed position by a helical spring 80. When the fluid pressure in the fluid passageway 66 exceeds a predetermined value, determined by the compression and spring constant of the spring 80, the valve member 78 opens against the force of the helical spring 80 and permits direct fluid flow from the fluid passageway 66 and into the reservoir 12.

Referring now to FIG. 1, the return line filter assembly 10 according to the present invention further comprises a filter assembly 90 having a tubular filter element 92 and a holder assembly 94. The filter element 92 is open at both its upper end 96 and its lower end 98 and is generally cylindrical in shape. In addition, the tubular filter element 92 includes an inner perforated tube 100 which serves as a fluid baffle and a filter media 102 such as pleated paper, coaxially disposed around the perforated tube 100. A plurality of circumferentially spaced connecting screws 104 (only one of which is shown) also extend axially upwardly from the upper end 96 of the filter element 92.

A tubular cylindrical metal strip 160 is provided around the lower interior side of the filter media 102 and axially extends for a distance at least as great as the axial length of the fluid ports 70. The strip 160 protects the filter media 102 from the force of the fluid exhausting out through the ports 70.

The holder assembly 94 further comprises an inverted U-shaped bracket 106 having a tubular member 108 secured to the free ends of its parallel legs 110. The tubular member 108 further includes a radially inwardly extending portion 112 at its upper end which extends over the upper end of the filter element 92. In addition, the radially extending portion 112 of the tubular member 108 includes apertures which receive the screws 104 of the filter element 102 therethrough. The bracket 106 with its attached tubular member 108 can thus be detachably secured to the filter element 92 by wing nuts 114 (only one of which is shown) so that upon tightening the wing nuts 114, the radially extending portion 112 of the tubular member 108 sealingly engages the upper end of the filter element 92.

The tubular member 108 is also coaxial with and spaced radially outwardly from the filter element 92 thus forming an annular outlet chamber 116 therebetween. The tubular member 108, moreover, is sufficiently long so that its lower free end 118 is positioned below the fluid lever 14 of the reservoir.

The lower end 119 of a connecting rod 120 is connected to the base leg 122 of the U-shaped bracket 106 so that the connecting rod 120 extends axially away from the tubular member 108. A cylindrical indicator member 124 having an enlarged diameter lower part 126 and a reduced diameter upper part 128 thus forming an annular flange 130 therebetween is secured to the upper end of the connecting rod 120.

The entire filter assembly 90 is insertable through the upper housing opening 19 to the position shown in FIG. 1 in which a portion of the housing part 44 extends entirely axially through the interior of the filter element 92. Moreover, the interior of the filter element 92 is spaced radially outwardly from the housing part 44 thus forming an annular fluid chamber 132 therebetween. The fluid ports 70 formed through the housing part 44 are open to the lower end of this chamber 132 and at a position below the fluid level 14 of the fluid reservoir.

Upon insertion of the filter assembly 90 into the housing 16, the base leg 122 of the U-shaped bracket 106 abuts against the upper end 134 of the elongated housing part 44 which thus limits the inward insertion of the filter assembly 90 into the housing 16. Moreover, upon complete insertion of the filter assembly 90 into the housing 16, fluid seals 136 and 138 respectively engage the upper end 96 and lower end 98 of the tubular filter element 92 thus fluidly sealing the axial ends of the filter element 92 to the housing part 44. Preferably the seals 136 and 138 are self-compensating metal seals and are of the same diameter.

With reference now to FIGS. 1 and 3, following insertion of the filter assembly 90 into the housing 16, the open top of the housing 16 is preferably closed by a closure cap 140 having a central opening 142. The reduced diameter portion 128 of the indicator member 124 is received within the opening 142 so that the closure cap 140 abuts against the annular flange 130 on the indicator member 124 thus firmly holding the filter assembly 90 in place within the housing 16. The closure cap 140 in turn is secured to the annular mounting flange 18 by the threaded fasteners 144.

Since a portion of the indicator member 124 is positioned through the closure cap central opening 142, the indicator member 124 is visible exteriorly of the housing 16 and provides a signal that the filter assembly 90 is properly positioned within the filter housing 16 without the necessity of removing the closure cap 140 for visual inspection of the filter element. If desired, a transparent plate 146 can be secured across the closure cap opening 142 to prevent fluid leakage without affecting the function of the indicator member 124.

With reference still to FIGS. 1 and 3, if desired, a pressure indicating means 148 can be connected to the flange 18 and fluidly connected to the inlet chamber 66 of the housing 16. The pressure indicating means 148 thus provides a signal of the inlet fluid pressure which in turn is indicative of the degree of clogging of the filter element 92.

Although the operation of the fluid filtering device 10 according to the present invention should by now be apparent, it will be briefly described in the interest of clarity. Assuming that the filter assembly 90 is properly positioned within the interior of the housing 16 in the fashion shown in FIG. 1, the inlet connector flange 60 is connected to the return line (not shown) of a fluid system (not shown) in any conventional manner. Fluid flow through the connector flange 60 flows into the passageway 66 up through the passageway 68 and out through the ports 70 and into the inlet chamber 132. Thus, the fluid flow is generally upward through the open lower end 98 of the filter element 92.

From the fluid chamber 132, the fluid flows radially outwardly through the filter element 92 which removes any debris contained within the fluid, then into the chamber 116 between the filter element 92 and the tubular member 108. Since the tubular member 108 is sealed to the upper end of the filter element, the tubular member 108 diverts the fluid flow downwardly through the chamber 116 and out through the openings 26 (FIG. 2) in the housing tubular member 22 and to the fluid reservoir. Moreover, since the lower end 118 of the tubular member 108 is positioned below the reservoir fluid level 14, the tubular member 108 prevents splashing of the fluid and the possible introduction of air bubbles into the fluid. The guide tube 22 also preferably includes perforations 23 to ensure that the fluid, typically oil, is broken up and allowed to stream.

When cleaning or replacement of the filter element 92 is required, the closure cap 140 is first removed from the mounting flange 18 and, thereafter, the entire filter assembly 90 is removed from the housing 16 by grasping the indicator member 124 and lifting it upwardly out through the open upper end 19 of the housing 16. As the filter assembly 90 is slid upwardly through the housing 16, the upper end 96 of the filter element 92 becomes positioned above the upper end 134 of the housing part 44 at substantially the same time that the lower end 98 of the filter element 92 registers with the reduced diameter portion 58 of the housing part 44. When this occurs, the fluid seal between the fluid element 92 and the housing part 44 is totally broken which permits any fluid entrapped within the chamber 132 or the chamber 116 to flow downwardly through the housing 16 and into the reservoir 12. Thus, splashing of the fluid outside of the housing during the removal of the filter assembly is effectively minimized.

Once the filter assembly 90 has been removed from the housing 16, the filter element 92 can be simply and rapidly replaced by merely unscrewing the wing nuts 114 and installing a new or cleaned filter element 92. The entire filter assembly 90 is then reinserted into the housing 16 as in the previously described manner. Fluid flow, however, can continue through the device 10 even when the filter assembly 90 is removed from the housing 16 although, of course, no filtering action is obtained. Moreover, since the fluid ports 70 are positioned below the reservoir fluid level 14, fluid flow through the device 10 while the filter assembly 90 is removed from the housing 16 does not introduce air bubbles into the reservoir fluid.

From the foregoing, it can be seen that the return line filter assembly 10 according to the present invention provides a unique and relatively inexpensive fluid filtering device in which the filter element can be removed from the housing for cleaning or replacement without interrupting the fluid flow through the return line. Moreover, the present invention is further advantageous in that it minimizes splashing of the fluid outside of the housing where splashing of the fluid can create an unsafe working condition. Moreover, the present invention provides means for simply but effectively preventing the introduction of air into the fluid in the reservoir both while the filter assembly is installed within the housing and when removed from it. A still further advantage of the present invention is that the indicator 124 provides an exteriorly visible signal that the filter assembly 90 is properly positioned within the housing 16 and without the necessity of removing the closure cap 140 for visual inspection of the filter element.

Having described my invention, however, many modifications thereto will become apparent to those skilled in the art to which it pertains without deviation from the spirit of the invention as defined by the scope of the appended claims.

I claim:

1. For use with a fluid system having a fluid reservoir at least partly filled with fluid to a fluid level, a fluid filtering device comprising:

an elongated housing having an open top at least a partially open bottom and an inner portion extending upwardly from said bottom, said housing being positioned within said reservoir so that the lower end of the housing is submerged in the fluid reservoir fluid, said housing having a fluid inlet formed on its lower end;

a filter assembly comprising a tubular filter element open at each end and a holder assembly detachably secured at one end to one axial end of the tubular filter element, the other end of the filter element being slidably insertable through the open top of the housing and over a portion of said housing so that said housing inner portion extends entirely axially through said filter element, said filter element being spaced radially outwardly from said housing inner portion thus forming an annular inlet chamber therebetween;

means for fluidly sealing both axial ends of the filter element to said housing inner portion;

fluid passage means formed through said housing for fluidly connecting said housing inlet with said annular inlet chamber; and means attached to said holder assembly for diverting fluid flow through said filter element toward the partially open bottom of the housing which is positioned below fluid level.

2. The invention as defined in claim 1 wherein said diverting means comprises a tubular member positioned coaxially around and spaced radially outwardly from said filter element, said tubular member having a top portion which closes against the first axial end of the filter element.

3. The invention as defined in claim 1 and further comprising an indicator member secured to the other end of the holder assembly and means for closing the open top of the housing, said closing means including an aperture into which at least a portion of the indicator member is received and visible exteriorly of the housing.

4. The invention as defined in claim 1 wherein a portion of the holder assembly abuts against the upper end of the housing inner portion and limits the insertion of the filter assembly into said housing.

5. The invention as defined in claim 1 wherein said housing further comprises an elongated guide tube into which the filter assembly is inserted, said guide tube being spaced radially outwardly from said filter element.

6. The invention as defined in claim 1 wherein said housing comprises a first part and a second part, said first part being upwardly extending and forming said housing inner portion, means for securing said second housing part to the lower end of said first housing part, said housing inlet formed in said second housing part and said fluid passage means being formed through both housing parts, wherein said securing means comprises an elongated bolt extending axially through said first housing part and also axially through a portion of the fluid passage means.

7. The invention as defined in claim 6 and further comprising a normally closed relief valve secured to said second housing part and open to said fluid passage means, said relief valve having means for opening at a predetermined pressure.

8. The invention as defined in claim 2 wherein the tubular member is longitudinally dimensioned so that the lower end of the tubular member is positioned below the fluid level of the reservoir.

9. The invention as defined in claim 1 wherein said fluid passage means are formed below the fluid level of the fluid reservoir.

10. The invention as defined in claim 1 wherein said sealing means further comprises a first annular seal secured to said housing inner portion for engaging one axial end of said filter element and a second annular seal secured to said housing inner portion for engaging the other axial end of the filter element, said seals having substantially the same diameter.

11. The invention as defined in claim 1 and further comprising means for protecting said filter element from high fluid flow through said fluid passage means.

12. The invention as defined in claim 11 wherein said protecting means further comprises a metal strip secured to the interior of said filter element, said metal strip being in alignment with the direction of fluid flow from said fluid passage means.

13. The invention as defined in claim 5 wherein the guide tube is perforated.

* * * * *

UNITED STATES PATENT AND TRADEMARK OFFICE
CERTIFICATE OF CORRECTION

PATENT NO. : 4,273,651

DATED : June 16, 1981

INVENTOR(S) : Nils O. Rosaen

It is certified that error appears in the above-identified patent and that said Letters Patent are hereby corrected as shown below:

Column 2, line 51, after "top", insert --plan--.

Column 3, line 31, after "20", insert --to--.

Signed and Sealed this

Twenty-fifth Day of August 1981

[SEAL]

Attest:

*Attesting Officer*

GERALD J. MOSSINGHOFF

*Commissioner of Patents and Trademarks*